(12) United States Patent
Kato et al.

(10) Patent No.: US 10,907,595 B2
(45) Date of Patent: Feb. 2, 2021

(54) PROTECTOR AND METHOD FOR MANUFACTURING PROTECTOR

(71) Applicant: TOYOTA JIDOSHA KABUSHIKI KAISHA, Toyota (JP)

(72) Inventors: Hiroya Kato, Nisshin (JP); Masayuki Tanaka, Toyota (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/380,293

(22) Filed: Apr. 10, 2019

(65) Prior Publication Data

US 2019/0331075 A1     Oct. 31, 2019

(30) Foreign Application Priority Data

Apr. 26, 2018   (JP) .................................. 2018-084998

(51) Int. Cl.
*F02M 39/02*     (2006.01)
*B29C 43/18*     (2006.01)
*B29C 43/00*     (2006.01)
*B29L 31/00*     (2006.01)
*B29K 307/04*    (2006.01)
*B29K 21/00*     (2006.01)

(52) U.S. Cl.
CPC ........... *F02M 39/02* (2013.01); *B29C 43/003* (2013.01); *B29C 43/18* (2013.01); *B29K 2021/00* (2013.01); *B29K 2307/04* (2013.01); *B29L 2031/7496* (2013.01); *B29L 2031/768* (2013.01); *F02M 2200/18* (2013.01)

(58) Field of Classification Search
CPC .. F02M 39/02; F02M 2200/18; B29C 43/003; B29C 43/18; B29K 2021/00; B29K 2307/04; B29L 2031/7496; B29L 2031/768
USPC ........................................................ 123/198
See application file for complete search history.

(56) References Cited

U.S. PATENT DOCUMENTS

| 9,897,056 B1* | 2/2018 | Kimball .................. F02M 59/44 |
| 2007/0031646 A1* | 2/2007 | Yamazaki ............. B29C 43/203 428/212 |
| 2012/0006304 A1* | 1/2012 | Wakabayashi ....... F02M 37/043 123/509 |
| 2015/0330427 A1* | 11/2015 | Johnson ................ F16B 5/0233 411/34 |

(Continued)

FOREIGN PATENT DOCUMENTS

| CN | 107208678 A | 9/2017 |
| JP | 2004-360581 | 12/2004 |

(Continued)

*Primary Examiner* — Joseph J Dallo
*Assistant Examiner* — Yi-Kai Wang
(74) *Attorney, Agent, or Firm* — Oblon, McClelland, Maier & Neustadt, L.L.P.

(57) ABSTRACT

A protector protects a high-pressure fuel pump of an internal combustion engine. The protector and the high-pressure fuel pump are fastened to an engine body by a bolt inserted through a metal collar. The protector further includes an elastic insulating layer located between the collar and a carbon fiber reinforced plastic portion. The collar is embedded in the carbon fiber reinforced plastic portion with the insulating layer compressed.

5 Claims, 5 Drawing Sheets

(56) References Cited

U.S. PATENT DOCUMENTS

2015/0337784 A1* 11/2015 Ishikawa ............... F02M 37/06
                                                                     123/198 E
2016/0305466 A1   10/2016 Kawashima et al.
2018/0026110 A1*  1/2018 Kobolla ............... H01L 23/367
                                                                       257/712
2018/0266463 A1*  9/2018 Mori .................... B29C 65/562

FOREIGN PATENT DOCUMENTS

| | | |
|---|---|---|
| JP | 2014-101807 | 6/2014 |
| JP | 2015-121316 | 7/2015 |
| JP | 2016-114139 | 6/2016 |
| JP | 2017-109715 | 6/2017 |

* cited by examiner

PROTECTOR AND METHOD FOR MANUFACTURING PROTECTOR

BACKGROUND

1. Field

The following description relates to a protector and a method for manufacturing the protector. The protector is coupled to the engine body of an internal combustion engine to protect a high-pressure fuel pump for the internal combustion engine.

2. Description of Related Art

Japanese Laid-Open Patent Publication No. 2014-101807 discloses an internal combustion engine including a protector that protects a high-pressure fuel pump. The protector and the high-pressure fuel pump are fastened to the head cover in the engine body of the internal combustion engine by bolts.

Japanese Laid-Open Patent Publication No. 2016-114139 discloses a structure in which adhesive serving as an insulating layer is arranged between a metal collar and a carbon fiber reinforced plastic portion. In this structure, the gap between the collar and the carbon fiber reinforced plastic portion is sealed by the adhesive to limit galvanic corrosion.

Plastic has a larger thermal expansion coefficient than metal. Thus, even when the gap between the collar and the plastic portion is sealed by adhesive, the insulating layer configured by the adhesive may not be able to follow the displacement difference between the collar and the plastic portion resulting from the difference in thermal expansion coefficient between the collar and the plastic portion. This may break the insulating layer. As a result, the entry of liquid may not be entirely prevented, thereby causing galvanic corrosion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A protector according to one aspect of the present disclosure includes a carbon fiber reinforced plastic portion made of carbon fiber reinforced plastic and a metal collar embedded in the carbon fiber reinforced plastic portion. The protector and a high-pressure fuel pump are fastened to an engine body of an internal combustion engine by a bolt inserted through the collar. The protector protects the high-pressure fuel pump. The protector further includes an elastic insulating layer located between the collar and the carbon fiber reinforced plastic portion. The collar is embedded in the carbon fiber reinforced plastic portion with the insulating layer compressed.

The collar and the plastic portion may have different displacement amounts because of the difference in thermal expansion coefficient between the collar and the plastic portion. The displacement difference may act in a direction in which the collar and the plastic portion are separated from each other. Even in this case, the above-described structure allows the compressed insulating layer to follow the displacement of the collar and the plastic portion and return to the original shape. This reduces the damage of the insulating layer resulting from the difference in thermal expansion coefficient and thus limits galvanic corrosion.

In order to reduce the weight of the internal combustion engine, the protector may be made of reinforced fiber plastic, which has a higher specific strength than, for example, cast iron.

However, when the plastic protector is fastened by bolts and used under a high-temperature environment, the portions of the protector that are fastened by the bolts may undergo creep deformation. When the creep deformation occurs, the fastening force produced by the bolts becomes low, thereby facilitating loosening of the bolts. To cope with this problem, metal collars, which are less likely to undergo creep deformation than plastic, may be embedded in the portions of the protector through which the bolts are inserted.

Nevertheless, carbon fibers used as reinforcing fibers are conductive. Thus, when liquid such as rainwater enters the boundary surface between the metal collar and the carbon fiber reinforced plastic portion, galvanic corrosion may occur. The above-described structure reduces such a problem.

Example 2

In the protector according to example 1, the collar is embedded in the carbon fiber reinforced plastic portion with the insulating layer compressed by a larger displacement amount than a maximum value of a displacement difference between the collar and the carbon fiber reinforced plastic portion that potentially occurs within a rated temperature range of the protector at a portion between the collar and the carbon fiber reinforced plastic portion where the insulating layer is located.

In the above-described structure, the insulating layer continues to follow the displacement difference between the collar and the carbon fiber reinforced plastic portion within the rated temperature range.

Example 3

In the protector according to example 1 or 2, the insulating layer is made of rubber, and the outer circumferential surface of the collar is coated with the insulating layer.

The insulating layer is arranged between the outer circumferential surface of the collar and the plastic portion by coating the outer circumferential surface of the collar with rubber in such a manner.

Example 4

A method for manufacturing a protector that protects a high-pressure fuel pump is provided as another aspect of the present disclosure. The protector includes a carbon fiber reinforced plastic portion made of carbon fiber reinforced plastic and a metal collar embedded in the carbon fiber reinforced plastic portion. The protector and the high-pressure fuel pump are fastened to an engine body of an internal combustion engine by a bolt inserted through the collar. The method includes coating an outer circumferential surface of the collar with an elastic insulating member, arranging, in a mold, the collar coated with the insulating member, filling the mold, in which the collar is arranged, with the carbon fiber reinforced plastic, applying pressure to the carbon fiber reinforced plastic, which fills the mold, to compress the insulating member with the carbon fiber reinforced plastic, and insert-molding, through the compression with the carbon fiber reinforced plastic, the collar into the carbon fiber reinforced plastic portion with an insulating layer made of the compressed insulating member located between the collar and the carbon fiber reinforced plastic portion.

In the above-described protector manufacturing method, the insulating member is compressed by utilizing the pressure applied to the carbon fiber reinforced plastic during insert-molding. This forms the compressed insulating layer.

Example 5

In the method according to claim 4, the applying pressure to the carbon fiber reinforced plastic includes applying pressure to the carbon fiber reinforced plastic until the elastic member becomes compressed by a larger displacement amount than a maximum value of a displacement difference between the collar and the carbon fiber reinforced plastic portion that potentially occurs within a rated temperature range of the protector at a portion between the collar and the carbon fiber reinforced plastic portion where the insulating layer is located.

In the above-described protector manufacturing method, the protector is manufactured with the insulating layer, which continues to follow the displacement difference between the collar and the carbon fiber reinforced plastic portion within the rated temperature range.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A protector 160 coupled to the engine body of an internal combustion engine 100 according to an embodiment of the present disclosure and a method for manufacturing the protector will now be described with reference to FIGS. 1 to 9.

Figure 1:
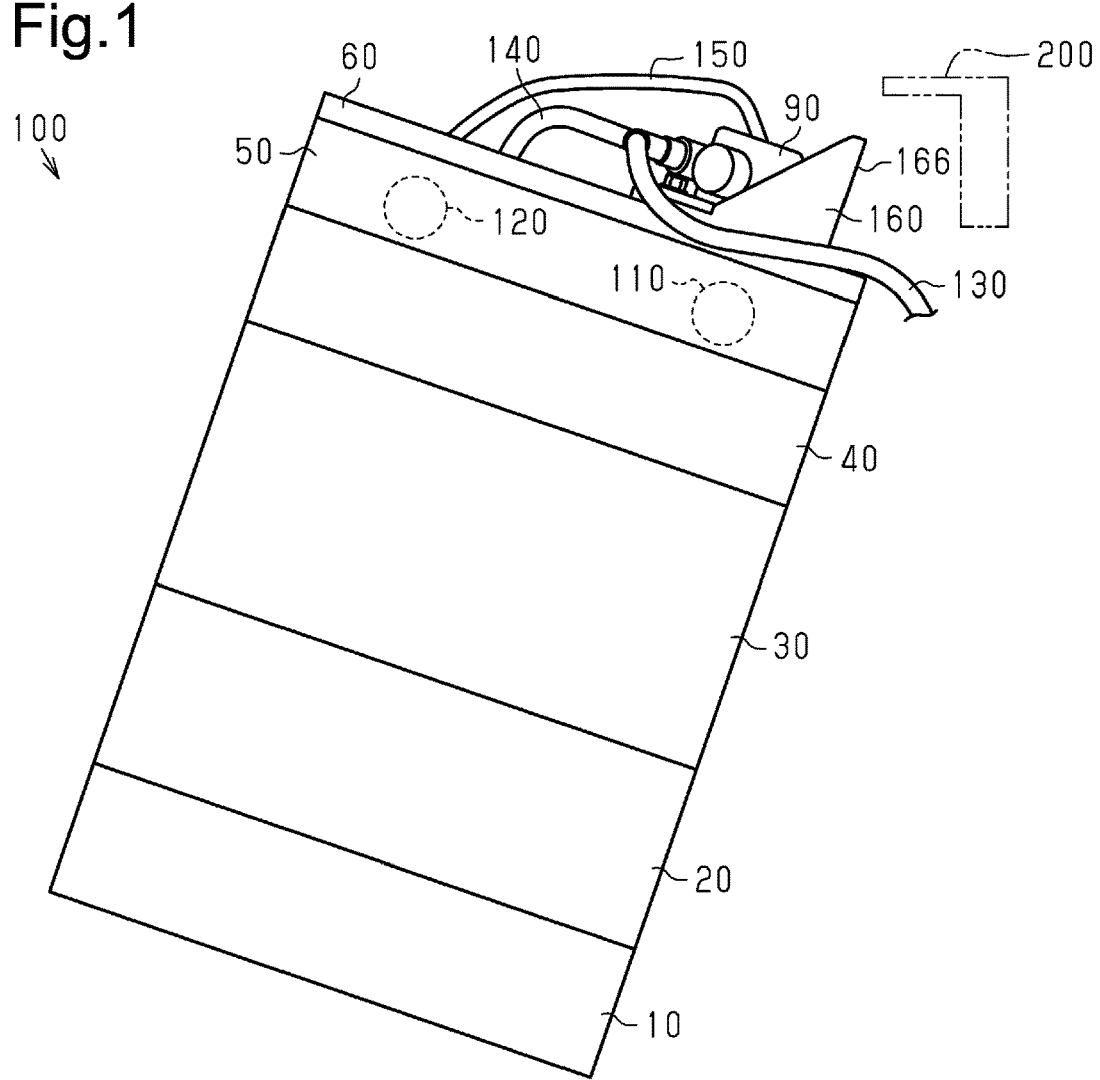
FIG. 1 is a schematic view illustrating where a high-pressure fuel pump and a protector are installed in an internal combustion engine.

As shown in FIG. 1, a crankcase 20 is coupled to the lower part of a cylinder block 30 of the internal combustion engine 100. An oil pan 10 is coupled to the lower end of the crankcase 20. A cylinder head 40 is coupled to the upper end of the cylinder block 30. A cam housing 50 is coupled to the upper end of the cylinder head 40. A cylinder head cover 60 is coupled to the upper end of the cam housing 50. The oil pan 10, the crankcase 20, the cylinder block 30, the cylinder head 40, the cam housing 50, and the cylinder head cover 60 are assembled to configure the engine body of the internal combustion engine 100.

A high-pressure fuel pump 90 and the protector 160 are coupled to the upper part of the engine body. That is, the high-pressure fuel pump 90 is located at the upper part of the cylinder head cover 60. The high-pressure fuel pump 90 compresses fuel supplied through a fuel supply pipe 130 to supply an in-cylinder fuel injection valve with high-pressure fuel through a high-pressure fuel pipe 150.

The cam housing 50 accommodates an intake camshaft 120 and an exhaust camshaft 110. The high-pressure fuel pump 90 is a plunger pump that is driven by the exhaust camshaft 110 and coupled to the upper side of the exhaust camshaft 110.

FIG. 1 shows the position of the internal combustion engine 100 installed in a vehicle. In FIG. 1, the left side corresponds to the front side of the vehicle, and the right side corresponds to the rear side of the vehicle. The internal combustion engine 100 is installed in the vehicle with the upper part of the internal combustion engine 100 inclined rearward such that the upper side of the internal combustion engine 100 is located rearward. As shown by the long dashed double-short dashed line, a cowl top panel 200 is arranged rearward from the high-pressure fuel pump 90 with the internal combustion engine 100 installed in the vehicle. The cowl top panel 200 is one of the components that configure the vehicle body.

When the vehicle collides with an object from the front, the collision deforms the front part of the vehicle, i.e., deforms the engine compartment accommodating the internal combustion engine 100. As a result, the internal combustion engine 100 moves rearward. This causes the protector 160 to abut the cowl top panel 200 and thus limits the collision of the high-pressure fuel pump 90 with the cowl top panel 200. That is, the protector 160 is arranged to protect the high-pressure fuel pump 90.

Figure 2:
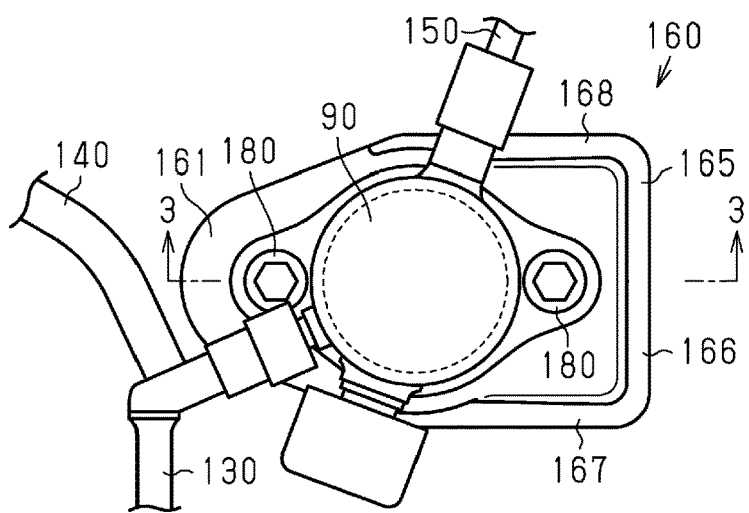
FIG. 2 is a plan view of the high-pressure fuel pump and the protector shown in FIG. 1.

As shown in FIG. 2, at the front side of the high-pressure fuel pump 90, the fuel supply pipe 130 branches into a pipe connecting to the high-pressure fuel pump 90 and a low-pressure fuel pipe 140. Fuel that has not been supplied from the fuel supply pipe 130 to the high-pressure fuel pump 90 is supplied to a port fuel injection valve through the low-pressure fuel pipe 140.

Figure 3:
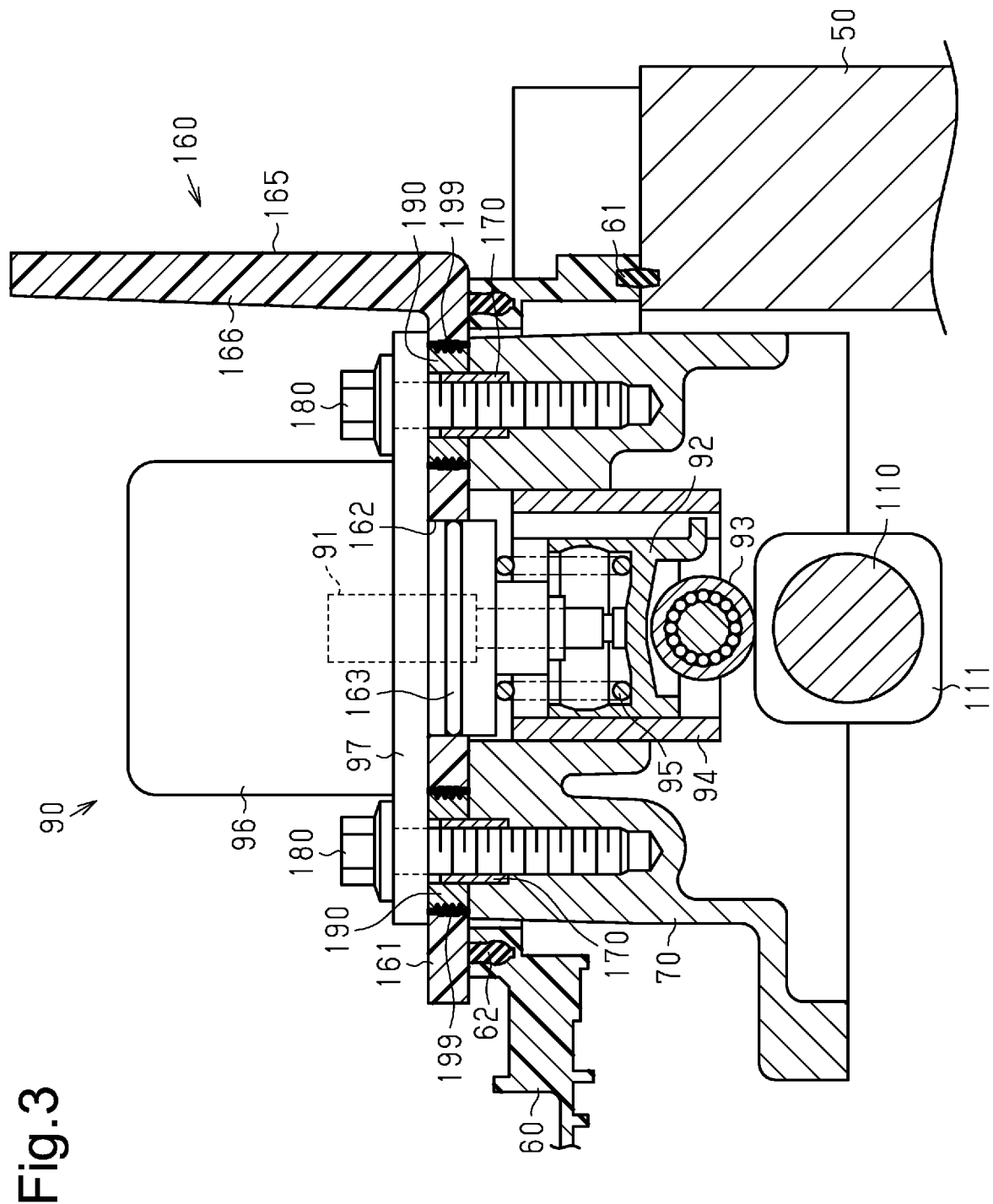
FIG. 3 is a cross-sectional view taken along line 3-3 in FIG. 2.
Figure 4:
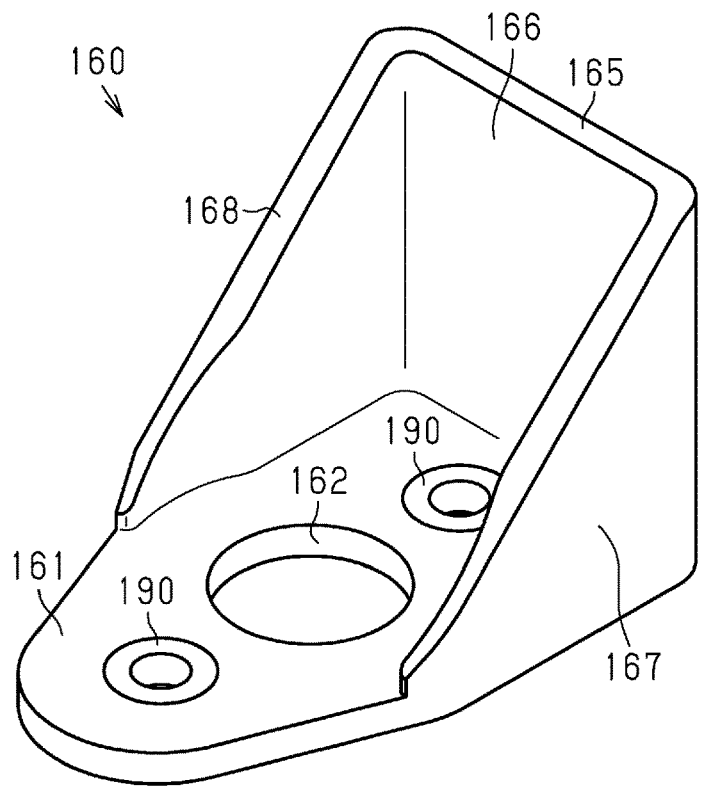
FIG. 4 is a perspective view of the protector shown in FIG. 3.

As shown in FIGS. 2 to 4, the protector 160 includes a bottom plate 161 and a wall plate 165 extending upward from the bottom plate 161.

As shown in FIG. 4, the bottom plate 161 has a through-hole 162. As shown in FIG. 3, a plunger 91 of the high-pressure fuel pump 90 is inserted through the through-hole 162 into the cam housing 50. The part between the high-pressure fuel pump 90 and the inner wall surface of the through-hole 162 is sealed by a rubber seal ring 163 fitted to the high-pressure fuel pump 90.

As shown in FIG. 3, the cam housing 50 includes a metal cam cap 70. In the cam housing 50, the exhaust camshaft 110 is rotationally supported by the cam cap 70 placed over the exhaust camshaft 110 from above.

The exhaust camshaft 110 includes a cam 111 that drives the high-pressure fuel pump 90. The cam 111 abuts a roller 93 on a lifter 92 of the high-pressure fuel pump 90. The cam cap 70 accommodates the lifter 92. A lifter guide 94 that guides vertical movement of the lifter 92 is fitted to the cam cap 70. The distal end of the plunger 91 is coupled to the lifter 92, and the plunger 91 and the lifter 92 are pushed down by a spring 95 toward the cam 111.

The cylinder head cover 60 opens such that the upper surface of the cam cap 70 is exposed. The protector 160 and the high-pressure fuel pump 90 are provided to close the opening of the cylinder head cover 60. A first oil seal 61 is fitted to a sealed portion of the cylinder head cover 60 and the cam housing 50, and a second oil seal 62 is fitted to a sealed portion of the bottom plate 161 of the protector 160 of the cylinder head cover 60.

The protector 160 is a plastic molding component made of a carbon fiber reinforced plastic. As shown in FIGS. 3 and 4, two metal collars 190 having a flat tubular shape are embedded into the bottom plate 161 (carbon fiber reinforced plastic portion).

As shown in FIG. 3, two tubular retainers 170 are fitted to the upper surface of the cam cap 70. The two retainers 170 are respectively inserted through the two collars 190 so that the protector 160 is positioned with respect to the cam cap 70. With the protector 160 positioned in such a manner, bolts 180 are used to fasten the protector 160 and the high-pressure fuel pump 90 to the mounting surface of the cam cap 70. More specifically, the bottom plate 161 of the protector 160 is held between a flange 97 arranged on the cover 96 of the high-pressure fuel pump 90 and the mounting surface of the cam cap 70. With the bottom plate 161 held between the flange 97 and the mounting surface in such a manner, the flange 97 of the high-pressure fuel pump 90 and the bottom plate 161 of the protector 160 are fastened to the mounting surface of the cam cap 70 by the bolts 180 to fix the protector 160 to the cam cap 70. This allows the high-pressure fuel pump 90 to be fastened to the outer side of the engine body with the plastic protector 160 held between the cam cap 70 and the flange 97 arranged on the cover 96, which surrounds a fuel chamber of the high-pressure fuel pump 90.

As shown in FIG. 3, the diameter of each collar 190 is slightly larger than the diameter of the head of the corresponding bolt 180.

As shown in FIGS. 2 and 4, the wall plate 165 of the protector 160 includes a front wall 166, a first side wall 167, and a second side wall 168. The front wall 166 is located at the rear side. As shown in FIG. 1, the front wall 166 is opposed to the cowl top panel 200. The first side wall 167 and the second side wall 168 respectively extend frontward from the opposite ends of the front wall 166.

As shown in FIG. 4, the first side wall 167 and the second side wall 168 become lower toward the front side. As shown in FIG. 2, this allows the first side wall 167, the second side wall 168, and the front wall 166 to surround the cover 96 of the high-pressure fuel pump 90 while avoiding interference with the fuel pipes.

The arrangement of the first side wall 167 and the second side wall 168 limits deformation of the front wall 166 in the front-rear direction of the vehicle, thereby increasing the strength of the protector 160.

If load acts on the protector 160 to cause the collars 190 to come off from the bottom plate 161, the protector 160 is displaced from the high-pressure fuel pump 90. This may prevent the protector 160 from properly protecting the high-pressure fuel pump 90.

Figure 5:
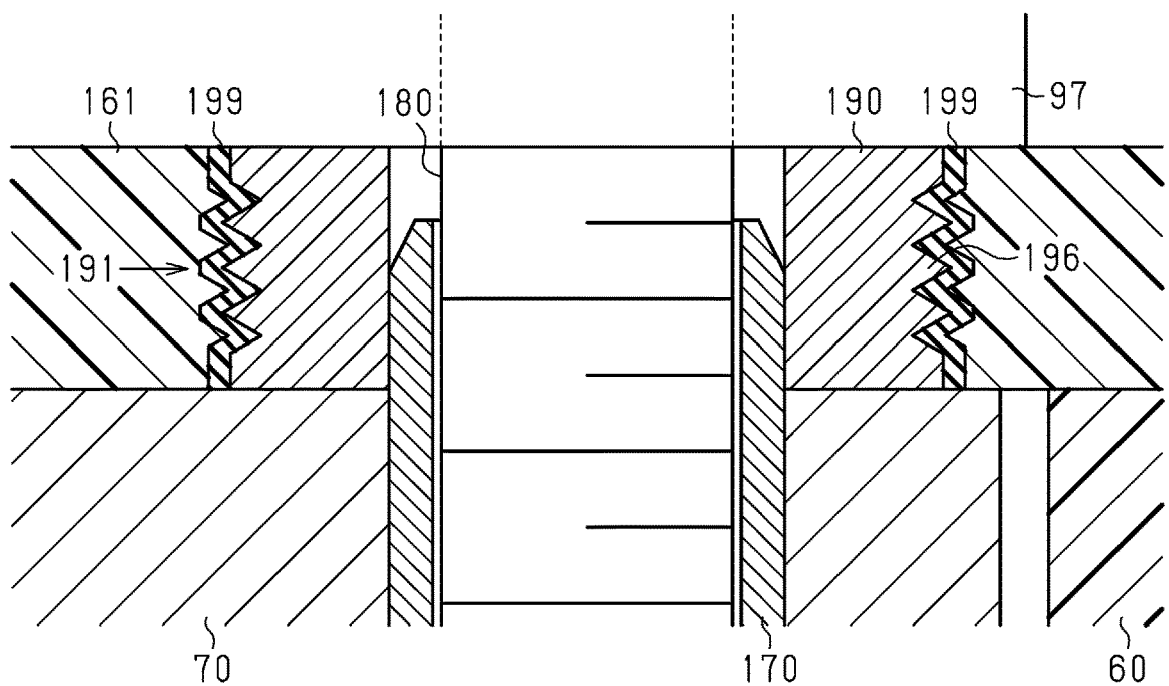
FIG. 5 is an enlarged cross-sectional view of the vicinity of one of the collars shown in FIG. 3.

As shown in FIG. 5, the protector 160 of the present embodiment includes an uneven portion 191 on the outer circumferential surface of each collar 190, which is annular, in order to prevent the removal of the collar 190 from the bottom plate 161. The uneven portion 191 is located at the middle part of the annular collar 190 in the thickness direction. The thickness direction of the collar 190 is orthogonal to the radial direction of the collar 190. The thickness direction of the collar 190 coincides with the thickness direction of the protector 160, that is, coincides with the thickness direction of the bottom plate 161 (carbon fiber reinforced plastic portion). Further, since the collar 190 has a flat cylindrical shape, the thickness direction of the collar 190 coincides with the axial direction of the collar 190. The uneven portion 191 includes three protrusions 196, each having a V-shaped cross section. The protrusions 196 are arranged in the thickness direction of the collar 190. Each protrusion 196 extends around the entire outer circumferential surface of the collar 190.

The outer circumferential surface of the collar 190 has troughs such that each protrusion 196 is located between the troughs. That is, the uneven portion 191 has four troughs and three protrusions 196 arranged alternately in the thickness direction of the collar 190 and thus has recesses and projections arranged alternately in the thickness direction of the collar 190.

Further, the outer circumferential surface of each collar is coated with electrically-insulating rubber to limit galvanic corrosion that occurs on the boundary between the metal collar 190 and the carbon fiber reinforced plastic portion, which includes conductive carbon fibers. This forms a rubber insulating layer 199 in the protector 160 between the plastic portion and the collar 190. The insulating layer 199 is located between the plastic portion and the collar 190 in a compressed state and shaped in conformance with the uneven portion 191.

As shown in FIG. 5, in the protector 160, plastic enters the troughs of each insulating layer 199, which is shaped in conformance with the uneven portion 191. Then, the plastic hardens in the troughs. Thus, in the protector 160, when load acts on the protector 160 fastened by the bolts 180 inserted through the collars 190, the plastic that has entered the troughs of the uneven portions 191 is engaged with the insulating layers 199, which coat the front surfaces of the protrusions 196. In other words, the protector 160 has a function of removal prevention to prevent the removal of the collars 190 from the protector 160. That is, in the protector 160, the arrangement of the uneven portions 191 produces an anchor effect, thereby preventing removal of the collars 190 from the plastic portion.

In the protector 160, the above-described structure is achieved by insert-molding the collars 190. The method for manufacturing the protector 160 will now be described.

A preform in which thermosetting plastic is used as a base material and carbon fibers are used as reinforcing fibers is inserted into a mold and then compressed. The preform is heated in this state to harden the thermosetting plastic. In this manner, the protector 160 is manufactured. The preform is configured by laminating, on a fabric into which carbon fibers are woven, sheets to which thermosetting plastic is applied and that is impregnated with the thermosetting plastic. In the preform, the sheets of the carbon fiber plastic are laminated in the thickness direction of the preform. Thus, the extending direction of the carbon fibers, which are reinforcing fibers of the preform, is perpendicular to the thickness direction of the preform.

In the process of forming the protector 160, each collar 190, which is coated with the corresponding rubber insulating layer 199, is arranged in the mold. The collar 190, which is made of metal, is insert-molded into the carbon fiber reinforced plastic portion by compressing and heating the preform with the collar 190 arranged in the mold in such a manner.

Figure 6:
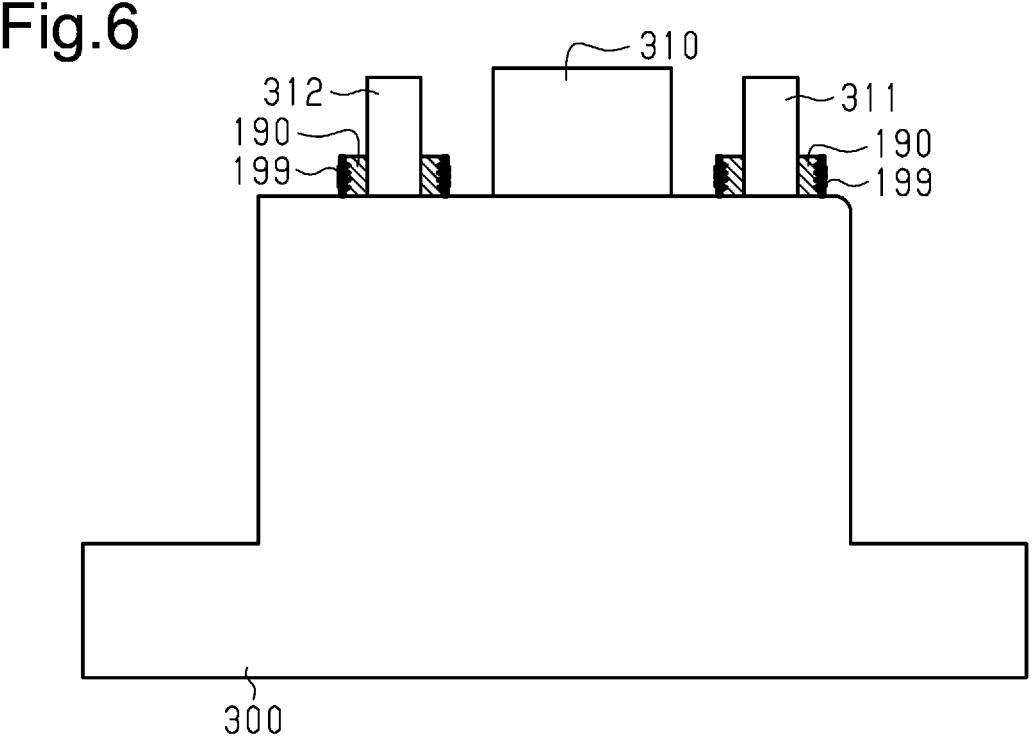
FIG. 6 is a schematic view illustrating a state in which the collars are arranged on a lower mold to manufacture the protector shown in FIG. 5.

More specifically, first, as shown in FIG. 6, the two collars 190 are respectively fitted to a first small-diameter pin 311 and a second small-diameter pin 312 of a lower mold 300 so that the two collars 190 are arranged on the lower mold 300. The lower mold 300 includes a large-diameter pin 310 arranged between the first small-diameter pin 311 and the second small-diameter pin 312. The large-diameter pin 310 has a larger diameter than the first small-diameter pin 311 and the second small-diameter pin 312. The large-diameter pin 310 has the same diameter as the through-hole 162 of the protector 160. The first small-diameter pin 311 and the second small-diameter pin 312 are positioned relative to the large-diameter pin 310. The diameters of the first small-diameter pin 311 and the second small-diameter pin 312 are slightly smaller than the inner diameters of the collars 190. Thus, fitting the collars 190 to the first small-diameter pin 311 and the second small-diameter pin 312 allows the collars 190 to be positioned relative to the large-diameter pin 310, i.e., the through-hole 162 in the protector 160.

Figure 7:
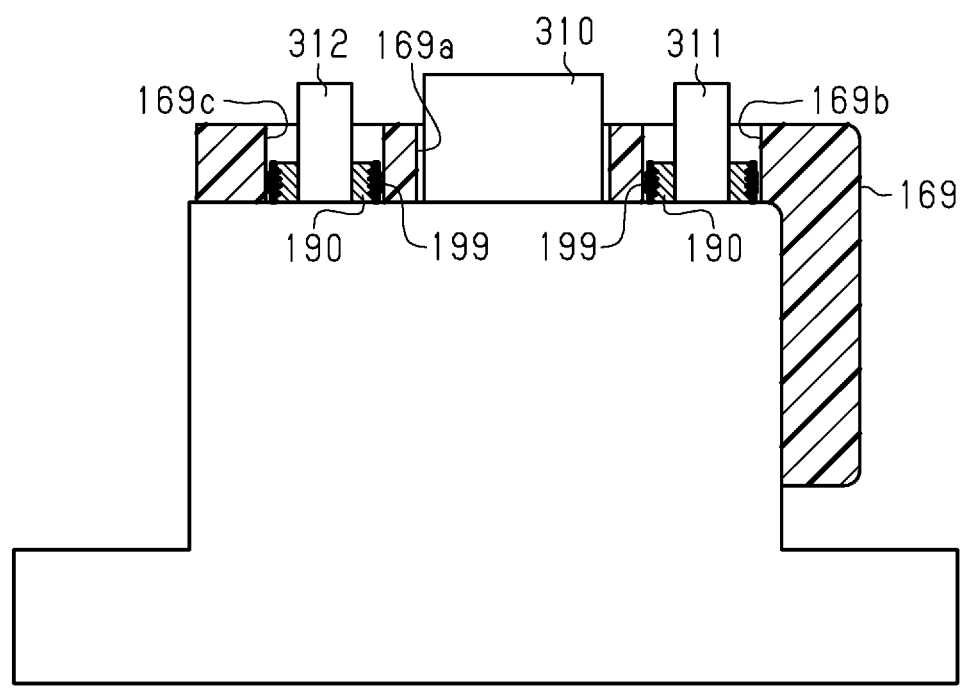
FIG. 7 is a schematic view illustrating a state in which a preform is arranged on the lower mold subsequent to the state of FIG. 6.

Next, as shown in FIG. 7, a preform 169 is arranged on the lower mold 300, on which the collars 190 are arranged. At this stage, the preform 169 has a large-diameter hole 169a, a first small-diameter hole 169b, and a second small-diameter hole 169c. The large-diameter pin 310 is inserted through the large-diameter hole 169a. The collar 190 fitted to the first small-diameter pin 311 is inserted through the first small-diameter hole 169b. The collar 190 fitted to the second small-diameter pin 312 is inserted through the second small-diameter hole 169c.

Figure 8:
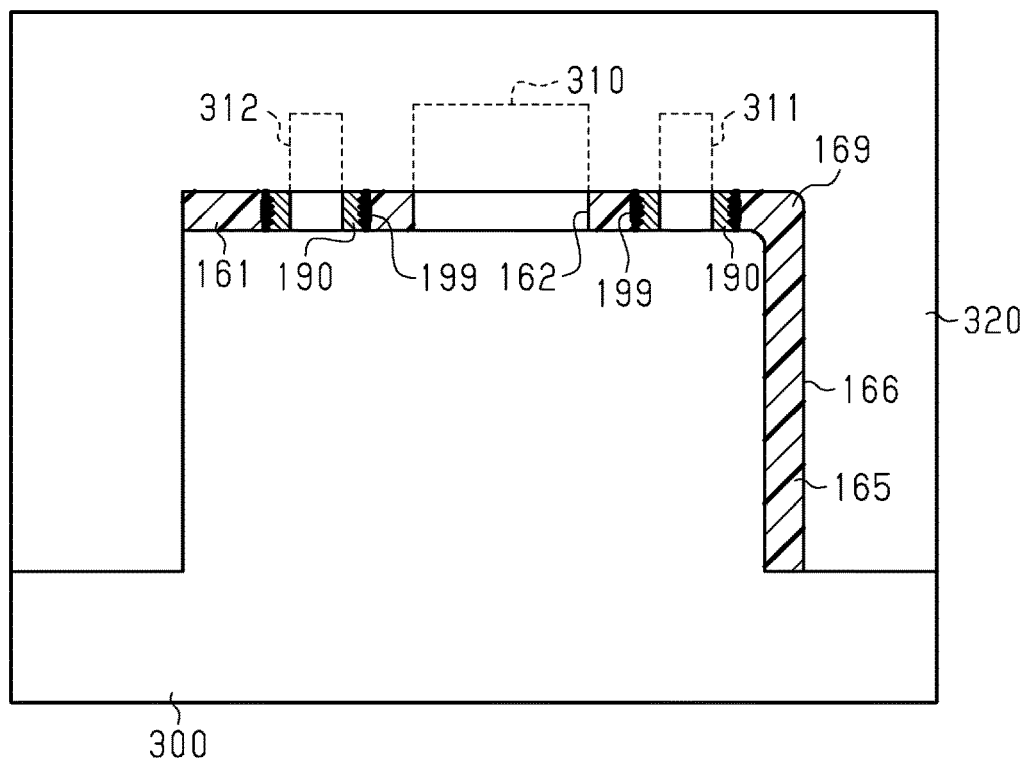
FIG. 8 is a schematic view illustrating a state in which the protector is being molded subsequent to the state of FIG. 7.

After the preform 169 is arranged as shown in FIG. 7, an upper mold 320 is fitted to the lower mold 300 to compress the preform 169 as shown in FIG. 8. In addition to the compression of the preform 169, the upper mold 320 and the lower mold 300 are heated to harden the thermosetting plastic of which the preform 169 is made. When the upper mold 320 and the lower mold 300 compress the preform 169, i.e., compress the carbon fiber reinforced plastic, the carbon fiber reinforced plastic derived from the preform 169 expands in the molds (upper mold 320 and lower mold 300). This forms the bottom plate 161 and the wall plate 165 of the protector 160.

Figure 9:
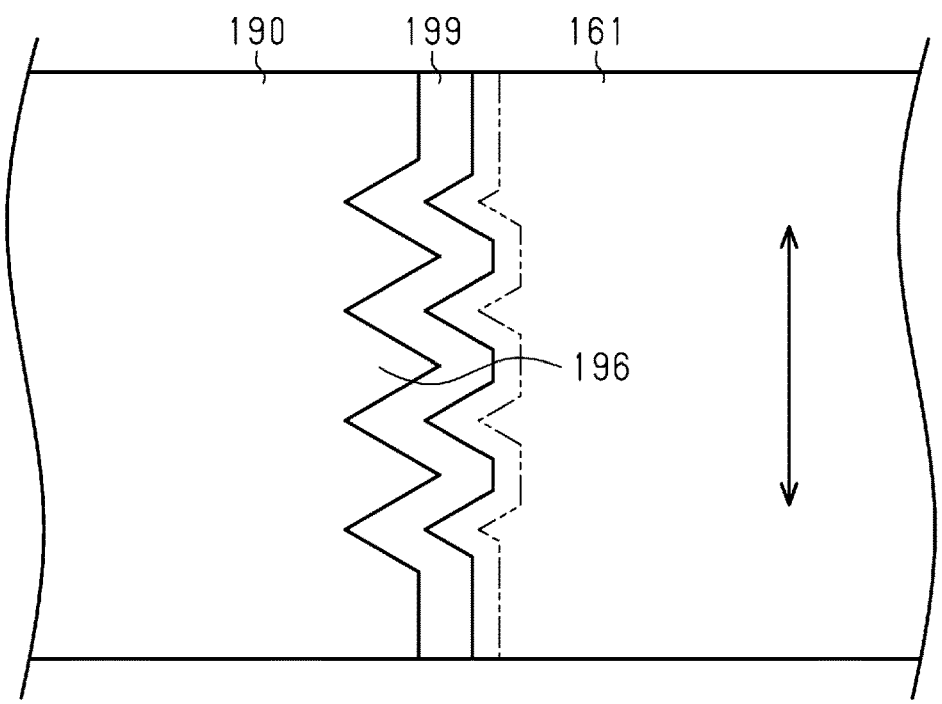
FIG. 9 is an enlarged schematic view showing the insulating layer between the collar and the plastic portion in the protector of FIG. 5.

Further, as shown in FIG. 9, the rubber insulating layer 199 coating the outer circumferential surface of the collar 190 is compressed from the position shown by the dashed and double-dotted line to the position shown by the solid line by the carbon fiber reinforced plastic. The carbon fiber reinforced plastic enters the troughs of the insulating layer 199, which is shaped in conformance with the uneven portion 191, to insert-mold the collar 190. Further, the carbon fiber reinforced plastic portion comes into close contact with the large-diameter pin 310 to form the through-hole 162.

In this manner, the protector 160 is manufactured with the carbon fiber reinforced plastic portion, which is plate-shaped and in which carbon fibers (reinforcing fibers) are laminated in the thickness direction of the carbon fiber reinforced plastic portion, and with the metal collars 190, which are embedded in the carbon fiber reinforced plastic portion.

In the process of compressing the carbon fiber reinforced plastic portion with the upper mold 320 and the lower mold 300, a displacement difference may occur between the collar 190 and the carbon fiber reinforced plastic portion at the portion where the insulating layer 199 is located. In the present embodiment, the compression amount of the insulating layer 199 is set based on the maximum value of the displacement difference between the collar 190 and the carbon fiber reinforced plastic portion that may occur within a rated temperature range of the protector 160. In the present embodiment, pressure is applied to the carbon fiber reinforced plastic portion until the insulating layer 199 becomes compressed by a larger displacement amount than the maximum value of the displacement difference that may occur within the rated temperature range, which is a temperature range within which the protector 160 can be used. In the carbon fiber reinforced plastic portion that configures most of the protector 160, carbon fibers are laminated in the thickness direction of the plate-shaped carbon fiber reinforced plastic portion as described above. This limits thermal expansion or thermal contraction of the carbon fiber reinforced plastic portion in the direction orthogonal to the thickness direction. In contrast, as shown by the double-sided arrow in FIG. 9, in the bottom plate 161, thermal expansion or thermal contraction in the thickness direction easily occurs in the carbon fiber reinforced plastic portion, which configures most of the protector 160. Thus, the compression amount of the insulating layer 199 is calculated based on the maximum value of the displacement difference in the thickness direction of the plate-shaped carbon fiber reinforced plastic portion.

In this manner, in the protector 160, the insulating layer 199 is compressed by a larger displacement amount than the maximum value of the displacement difference between the collar 190 and the carbon fiber reinforced plastic portion, which may occur within the rated temperature range at the portion where the insulating layer 199 is located. The collar 190 is embedded in the carbon fiber reinforced plastic portion with the insulating layer 199 compressed in this manner.

The operation of the protector 160 of the present embodiment will now be described.

When the vehicle collides with an object from the front so that the front part of the vehicle deforms rearward, the deformation of the front part of the vehicle causes the internal combustion engine 100 to move rearward. In the internal combustion engine 100, which includes the protector 160, the front wall 166 of the wall plate 165 of the protector 160 is arranged rearward from the high-pressure fuel pump 90. Thus, when the internal combustion engine 100 moves rearward, the front wall 166 abuts the cowl top panel 200, thereby preventing the high-pressure fuel pump 90 from colliding with the cowl top panel 200. That is, since the high-pressure fuel pump 90 is protected by the protector 160, the high-pressure fuel pump 90 is prevented from directly colliding with the cowl top panel 200.

In addition, the protector 160 includes the uneven portion 191 on the outer circumferential surface of the collar 190. Thus, even if load acts on the protector 160, the anchor effect limits removal of the collar 190 from the protector 160.

The advantages of the present embodiment will now be described.

(1) When the protector 160 thermally expands or contracts, each metal collar 190 and the carbon fiber reinforced plastic portion may have different displacement amounts because of the difference in thermal expansion coefficient between the collar 190 and the plastic portion. Even if the displacement difference acts in a direction in which the collar 190 and the plastic portion are separated from each other, the compressed insulating layer 199 follows the displacement of the collar 190 and the plastic portion and returns to the original shape. This reduces the damage of the insulating layer 199 resulting from the difference in thermal expansion coefficient and thus limits galvanic corrosion.

(2) Each collar 190 is embedded with the insulating layer 199 compressed by a larger displacement amount than the maximum value of the displacement difference between the collar 190 and the carbon fiber reinforced plastic portion that may occur within the rated temperature range of the protector 160. Thus, the insulating layer 199 continues to follow the displacement difference between the collar 190 and the carbon fiber reinforced plastic portion within the rated temperature range.

(3) The protector 160 is mostly made of a carbon fiber reinforced plastic, which has a higher specific strength than metal. Thus, the internal combustion engine 100 of the present embodiment is lighter than, for example, an internal combustion engine in which a metal protector is arranged and the high-pressure fuel pump 90 is protected by the metal protector. Among fiber reinforced plastics, carbon fiber reinforced plastic particularly has a high specific strength. This is especially advantageous for reducing the weight of the internal combustion engine 100.

(4) Utilizing the elasticity of the plastic of which the protector 160 is made, vibration that occurs when the high-pressure fuel pump 90 is running can be dampened. This reduces the operating noise of the high-pressure fuel pump 90 emitted into the air.

(5) When plastic members are fastened by bolts and continue to be used under a high-temperature environment, the plastic members undergo creep deformation. When the creep deformation occurs, the fastening force produced by the bolts becomes low, thereby facilitating loosening of the bolts. In the protector 160, the metal collars 190 configure portions of the bottom plate 161 that are held between the mounting surface of the cam cap 70 and the flange 97 and through which the bolts 180 are inserted. That is, in the bottom plate 161, the metal collars 190, which are less likely to undergo creep deformation than plastic, configure portions through which the bolts 180 are inserted, where load resulting from the fastening particularly tends to act. This limits decreases in the fastening force that result from creep deformation.

(6) The collars 190 are insert-molded. Thus, for example, as comparted to when the bottom plate 161 has a hole into which each collar 190 is press-fitted and the collar 190 is press-fitted into the hole, the removal of the collar 190 from the bottom plate 161 is limited in the present embodiment.

(7) The uneven portion 191 includes the protrusions 196, each of which has a V-shaped cross section. Thus, the front surface of each protrusion 196 intersects the direction of displacement of the carbon fiber reinforced plastic portion, which configures the bottom plate 161, resulting from thermal expansion or thermal contraction. Accordingly, when thermal expansion or thermal contraction causes the carbon fiber reinforced plastic portion to be displaced, some parts of the plastic portion are displaced toward the front surfaces of the protrusions 196. This presses the plastic portion toward the insulating layer 199 and thus ensures the sealing performance.

(8) The collars 190 are insert-molded. This eliminates the need for machining that is required when using, for example, the structure in which the collars 190 are press-fitted. Thus, for example, there is no need to provide a flaring portion in the distal end of each collar 190 or provide a flaring portion in the opening of the hole into which the collar 190 is press-fitted.

(9) The method for forming the through-hole 162 in the bottom plate 161 of the protector 160 may include, for example, a method for hardening a fiber reinforced plastic to form the bottom plate 161 and then forming the through-hole 162 in the bottom plate 161 through drilling. However, in this case, the cut surfaces of the reinforcing fibers are exposed on the inner circumferential surface of the through-hole 162. If the cut surfaces of the reinforcing fibers are exposed on the inner circumferential surface of the through-hole 162, the seal ring 163 may be damaged by the reinforcing fibers when the high-pressure fuel pump 90 is inserted into the through-hole 162. This may lower the sealing performance. In the above-described method for manufacturing the protector 160, the large-diameter pin 310 is arranged on the lower mold 300. Then, the preform 169, through which the large-diameter pin 310 is inserted, is compressed and heated so that the plastic portion derived from the preform 169 is in contact with the large-diameter pin 310. This forms the through-hole 162, through which the high-pressure fuel pump 90 is inserted. Thus, in the present embodiment, the plastic flows to the boundary surface with the large-diameter pin 310. This limits the exposure of the reinforcing fibers on the inner circumferential surface of the through-hole 162. Accordingly, the seal ring 163 is less likely to be damaged, thereby limiting decreases in the sealing performance.

(10) As described with reference to FIG. 6, the above-described protector manufacturing method includes a first step of arranging each collar 190 in the mold in a state in which the outer circumferential surface of the collar 190 is coated with rubber (insulating layer 199), which is an elastic insulating member. Further, as described with reference to FIGS. 8 and 9, the rubber is compressed by the carbon fiber reinforced plastic (preform 169) by applying pressure to the carbon fiber reinforced plastic. The protector manufacturing method includes a second step of insert-molding the collar 190 in the carbon fiber reinforced plastic portion with the insulating layer 199, which is made of the compressed rubber, located between the collar 190 and the carbon fiber reinforced plastic portion because of the rubber compression.

In such a protector manufacturing method, the rubber (insulating layer 199) is compressed by utilizing the pressure applied to the carbon fiber reinforced plastic (preform 169) during insert-molding. This forms the compressed insulating layer 199.

(11) In the second step of the above-described protector manufacturing method, pressure is applied to the carbon fiber reinforced plastic (preform 169) until the rubber (insulating layer 199) becomes compressed by a larger displacement amount than the maximum value of the displacement difference between the collar 190 and the carbon fiber reinforced plastic portion that may occur within the rated temperature range of the protector 160. Thus, in the above-described protector manufacturing method, the protector 160 is manufactured with the insulating layer 199, which continues to follow the displacement difference between the collar 190 and the carbon fiber reinforced plastic portion within the rated temperature range.

The present embodiment may be modified as described below. The present embodiment and the following modifications may be implemented in combination with each other as long as technical contradiction does not occur.

In the above-described example, the uneven portion 191 includes three protrusions 196. However, the uneven portion 191 simply needs to include recesses and projections arranged alternately in the thickness direction of the collar 190, and the specific structure of the uneven portion 191 may be changed. For example, when an uneven portion includes protrusions, the number of the protrusions may be changed. Additionally, the cross-sectional shape of each protrusion does not have to be V-shaped. Further, an uneven portion may include protuberances instead of protrusions that are continuous with one another in the circumferential direction.

The collar 190 does not have to include the uneven portion 191. That is, an uneven portion that serves to prevent the removal of the collar 190 from the plastic portion does not necessarily have to be provided.

Instead of insert-molding the collar 190, the collar 190 may be press-fitted to a hole formed in the bottom plate 161, which is made of carbon fiber reinforced plastic. In this case, when the collar 190 is press-fitted to the hole, the insulating layer 199 is compressed.

The compression amount of the insulating layer 199 does not necessarily have to be larger than the maximum value of the displacement difference between the collar 190 and the carbon fiber reinforced plastic portion within the rated temperature range. When at least the insulating layer is compressed, the insulating layer returns to the original shape within the range of the compression amount by following the displacement difference in thermal expansion coefficient between metal and carbon fiber reinforced plastic.

The insulating member that configures the insulating layer 199 is not limited to rubber. As long as the insulating member has elasticity, a material other than rubber may be used. For example, electrically-insulating elastomer may be used to configure the insulating layer 199.

In the above-described example, the insulating layer 199 coating the outer circumferential surface of the collar 190 is used. However, the insulating layer 199 does not have to be configured in such a manner. For example, a part between the outer circumferential surface of the collar 190 and the carbon fiber reinforced plastic portion may be filled with an elastic insulating member through the application of pressure. In this manner, the compressed insulating layer 199 may be located between the outer circumferential surface of the collar 190 and the carbon fiber reinforced plastic portion.

The protector 160 does not necessarily have to protect the high-pressure fuel pump 90 from collision with the cowl top panel 200. The components of the vehicle that are likely to collide with the high-pressure fuel pump 90 differ depending on the layout of the vehicle components. Thus, the protector 160 simply needs to include the wall plate 165 located between the high-pressure fuel pump 90 and the components that are likely to collide with the high-pressure fuel pump 90.

In the above-described example, the wall plate 165 of the protector 160 is configured by the front wall 166, the first side wall 167, and the second side wall 168. Instead, the structure and shape of the wall plate 165 may be changed. For example, the wall plate 165 may be configured by the front wall 166 and the first side wall 167 without the second side wall 168. Alternatively, the wall plate 165 may be configured only by the front wall 166 without the first side wall 167.

In the above-described example, the high-pressure fuel pump 90 is a plunger pump driven by the exhaust camshaft 110. However, the high-pressure fuel pump 90 does not have to be a plunger pump. Alternatively, the high-pressure fuel pump 90 may be driven by the intake camshaft 120. As another option, the high-pressure fuel pump 90 does not have to be driven by a camshaft and may be coupled to and driven by a crankshaft.

Further, the high-pressure fuel pump 90 may be an electric pump incorporating an electric actuator 98 that drives the plunger 91. That is, the high-pressure fuel pump 90 may be an electrically-driven pump. This eliminates the need for the protector 160 to have through-holes 162 through which the plunger 91 is inserted. This also increases the flexibility for the position where the high-pressure fuel pump 90 in the engine body is coupled. For example, the high-pressure fuel pump 90 may be coupled to the cylinder block 30.

In the manufacturing method of the above-described embodiment, the collar 190 is insert-molded by inserting a preform formed by laminating sheets into a mold. However, such a manufacturing method does not have to be used as a method for manufacturing the protector 160. For example, other methods may be used to form a preform in which carbon fibers are laminated in the thickness direction. As an example, a preform may be formed by mixing carbon fibers with thermosetting plastic and repeatedly applying the mixture to the preform. Even when such a method is used to form a preform, a preform in which carbon fibers are laminated in the thickness direction can be formed.

Further, the protector 160 may be configured by a carbon fiber reinforced plastic portion in which carbon fibers are not laminated in the thickness direction. Even in this case, the elastic insulating layer 199 simply needs to be located between the collar 190 and the carbon fiber reinforced plastic portion, and the collar 190 simply needs to be embedded in the carbon fiber reinforced plastic portion with the insulating layer 199 compressed. In such a structure, the compressed insulating layer 199 follows the displacement of the collar 190 and the plastic portion to return to the original shape. This limits the damage of the insulating layer 199 caused by the difference in thermal expansion coefficient between metal and plastic and thus limits galvanic corrosion.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A protector comprising:
a carbon fiber reinforced plastic portion made of carbon fiber reinforced plastic; and
a metal collar embedded in the carbon fiber reinforced plastic portion, wherein
the protector and a high-pressure fuel pump are fastened to an engine body of an internal combustion engine by a bolt inserted through the collar, wherein the protector protects the high-pressure fuel pump,
the protector further comprises an elastic insulating layer located between the collar and the carbon fiber reinforced plastic portion, and
the collar is embedded in the carbon fiber reinforced plastic portion with the insulating layer compressed,
wherein the collar is held between a flange of the high-pressure fuel pump and the engine body,
wherein recesses and projections are arranged alternately in a thickness direction of the collar for preventing removal of the collar from the carbon fiber reinforced plastic portion,
wherein the collar has a flat tubular shape held between the flange of the high-pressure fuel pump and the engine body, and
wherein the recesses and projections are arranged on an outer circumferential surface of the flat tubular collar.

2. The protector according to claim 1, wherein the collar is embedded in the carbon fiber reinforced plastic portion with the insulating layer compressed by a larger displacement amount than a maximum value of a displacement difference between the collar and the carbon fiber reinforced plastic portion that potentially occurs within a rated temperature range of the protector at a portion between the collar and the carbon fiber reinforced plastic portion where the insulating layer is located.

3. The protector according to claim 1, wherein
the insulating layer is made of rubber, and
the outer circumferential surface of the collar is coated with the insulating layer.

4. A method for manufacturing a protector that protects a high-pressure fuel pump, the protector including a carbon fiber reinforced plastic portion made of carbon fiber reinforced plastic and a metal collar embedded in the carbon fiber reinforced plastic portion, the protector and the high-pressure fuel pump being fastened to an engine body of an internal combustion engine by a bolt inserted through the collar, the collar being held between a flange of the high-pressure fuel pump and the engine body, and wherein the method comprising:
coating an outer circumferential surface of the collar with an elastic insulating member;
arranging, in a mold, the collar coated with the insulating member;
filling the mold, in which the collar is arranged, with the carbon fiber reinforced plastic;
applying pressure to the carbon fiber reinforced plastic, which fills the mold, to compress the insulating member with the carbon fiber reinforced plastic; and
insert-molding, through the compression with the carbon fiber reinforced plastic, the collar into the carbon fiber reinforced plastic portion with an insulating layer made of the compressed insulating member located between the collar and the carbon fiber reinforced plastic portion, and
arranging recesses and projections alternately in a thickness direction of the collar for preventing removal of the collar from the carbon fiber reinforced plastic portion on an outer circumferential surface of a tubular collar so that the flat tubular collar is to be held between the flange of the high-pressure fuel pump and the engine body.

5. The method according to claim 4, wherein the applying pressure to the carbon fiber reinforced plastic includes applying pressure to the carbon fiber reinforced plastic until the elastic member becomes compressed by a larger displacement amount than a maximum value of a displacement difference between the collar and the carbon fiber reinforced plastic portion that potentially occurs within a rated temperature range of the protector at a portion between the collar and the carbon fiber reinforced plastic portion where the insulating layer is located.

* * * * *